Figure 1:
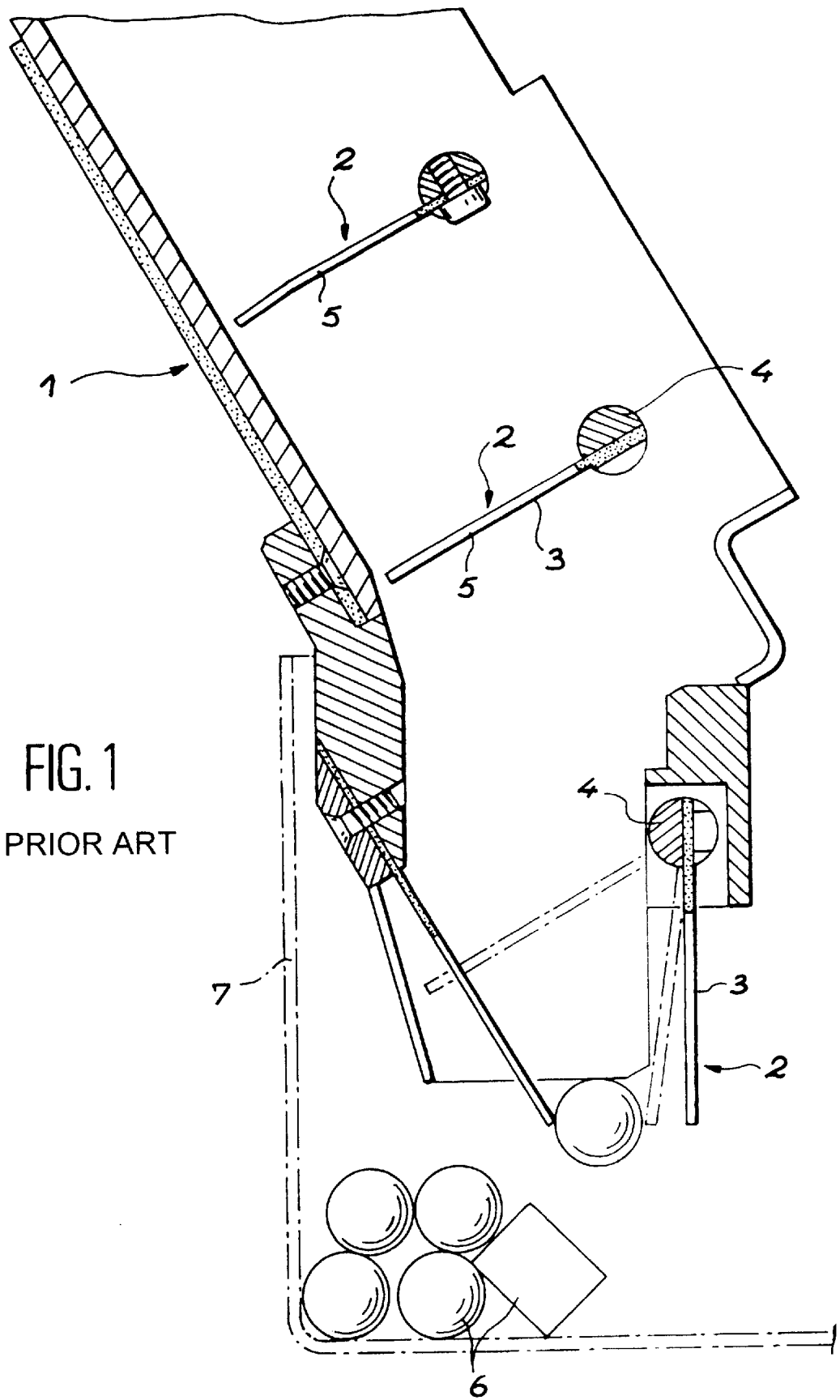

United States Patent

Sanchis et al.

[11] Patent Number: 5,911,667
[45] Date of Patent: Jun. 15, 1999

[54] DEVICE FOR CARRYING FALLING OBJECTS

[75] Inventors: Hervé Sanchis, Les Angles; Georges Badard, Connaux, both of France

[73] Assignee: Compagnie Generale des Matieres Nucleaires, Velizy Villacoublay, France

[21] Appl. No.: 09/088,793

[22] Filed: Jun. 1, 1998

[30] Foreign Application Priority Data

Jun. 16, 1997 [FR] France ................................ 97-07435

[51] Int. Cl.$^6$ ........................ B65B 35/30; B65G 21/10; B65G 11/10
[52] U.S. Cl. ........................ 53/531; 198/536; 198/534; 193/25 FT; 193/3; 53/534; 53/540; 53/543
[58] Field of Search .................... 198/536, 523, 198/534, 535, 956, 587; 53/531, 534, 540, 544, 543; 193/7, 258 T, 3

[56] References Cited

U.S. PATENT DOCUMENTS

| | | | |
|---|---|---|---|
| 2,032,258 | 2/1936 | Caton | 193/7 |
| 3,565,225 | 2/1971 | Fay | 193/7 |
| 3,732,961 | 5/1973 | Thornton et al. | 193/7 |
| 5,588,285 | 12/1996 | Odenthal | 53/534 |

FOREIGN PATENT DOCUMENTS

| | | |
|---|---|---|
| 660426 | 5/1938 | Germany. |
| 333656 | 8/1930 | United Kingdom. |

*Primary Examiner*—Joseph E. Valenza
*Assistant Examiner*—Joe Dillon, Jr.
*Attorney, Agent, or Firm*—Pearne, Gordon, McCoy & Granger LLP

[57] ABSTRACT

The objects (6) fall into a well (10) where their fall is slowed down by slanted blades (13) covered by a damping layer and situated in front of a counter-wall (14) from which they are separated by a gap (16). The counter-wall (14) is elastic so as to make the objects falling onto it rebound towards the lower blade. An outgoing track of the well (26) having a round shape is covered with a damping layer which absorbs the free fall energy at the outlet of the device. The invention can be applied to the continuous bulk carrying of fragile objects, such as pellets.

10 Claims, 6 Drawing Sheets

DEVICE FOR CARRYING FALLING OBJECTS

FIELD OF THE INVENTION

The invention concerns a device for carrying down objects and in particular a large number of objects descended in bulk in a vertical or slanted flow path in a continuous process.

BACKGROUND OF THE INVENTION

These objects are subjected to a large number of violent impacts amongst one another and on the path walls likely to damage them and slightly reject them, especially if they they are rather brittle or fragile. A known device shown on FIG. 1 includes inside a slanted well 1 a set of locks 2 forming superimposed traps and each composed of a blade 3 with one end screwed to a pivoting axis 4. The blades 3 are recessed with the shape of a comb and therefore contain parallel slits 5 into which the objects to be carried down, such as pellets 6, are distributed evenly. The locks 2 are controlled so as to lower the plates 3 in succession for a short while so as to allow the packets of pellets 6 to fall as far as the immediately lower plate 3. In correlation with the inclination of the well 1, it is therefore possible to attenuate the free fall of the pellets 6, but they remain subject to a large number of impacts when they have left the well 1 and fall into a storage container 7. It is therefore desirable to perfect this type of device.

This can be achieved by the invention and is based on the notion of attenuating in another way the fall of the objects carried and lowered whilst significantly reducing the number of times of them striking one another on the path. The discontinuous falling movement via packets of objects, characteristic of the device briefly described above, is replaced by an independent continuous falling movement of the objects, this being obtained by means of a different disposition of the well and the braking blades occupying it.

More specifically, the blades are fixed, the well includes an elastic wall situated in front of and at a certain distance from the lower edges of the blades, the device further including a track situated under the blades and rounded between one upper approximately vertical edge and connected to the well and an approximately horizontal edge extending under the elastic wall. In addition, the blades and track are covered with a damping material. The objects slide or roll onto the blades without acquiring any significant kinetic energy owing to the damping procured by these blades, and the speed they have acquired is sufficient to project them onto the elastic wall and rebounding from said wall so as to fall back onto the lower blade where an identical movement is resumed. The intended purpose of the lower track is to absorb the fall energy of the objects and make them leave the device at a horizontal speed, which is relatively slow on account of its damping properties.

Other additions and improvements can be made to the carrying device described above: it can in particular be applied to the filling of a container, such as said container 7, by the objects, it then being advantageous for the objects to be laid down by successive layers in the container. It is advisable that the well slides vertically inside a support connected to a lifting device, that the support of the well and the container be connected by a device sending them an alternative horizontal movement, or that the well is fed by a conveyor ending in front of the blades and able to move transversally with an alternative movement.

The variable nature of the objects carried and the empirical character of the phenomena produced on falling may require that a large number of preliminary tests or device adjustment changes be made. Depending on the case, the stiffness of the blades, their distance from the elastic wall or the tension of said wall shall be modified.

BRIEF DESCRIPTION OF THE DRAWINGS

All these elements of the invention, as well as others, shall now be described in more detail with the aid of the following accompanying figures, given by way of non-restrictive illustration:

FIG. 1, already described, illustrates one of the embodiments of the prior art ;

FIGS. 2 and 3 represent top and side views of the main elements of the device of the invention;

FIG. 4 illustrates certain embodiments of the damping blades;

FIG. 5 illustrates a mechanism for adjusting the elastic wall for a different embodiment;

and FIG. 6 illustrates the well in the lifted up state.

DETAILED DESCRIPTION OF THE PREFERRED EMBODIMENTS

The description shall first of all concern FIG. 2. The well of the invention bears the reference 10 and is submerged in a storage container 11 identical to the container 7 and when it is necessary to fill with objects, such as the pellets 6. The well 10 includes two flat lateral walls 12, only one being shown on the drawing, and are joined by slanted parallel blades 13 and placed above one another upwards along the well 10, and a counter-wall 14 extending over the entire height of the well 10 and in particular in front of the lower edges 15 of the blades 13, one blade being separated from the counter-wall by gaps 16. The counter-wall 14 has a lower edge 17 bent inwards towards the blades 13, and its upper rim 18 is screwed to a small bar 19 screwed to the lateral walls 12 of the well it contributes in joining together. The small bar 19 is suspended from a sleeve 20 which rises above the well 10 and is able to make the well 10 slide into a housing 21 which traverses a support 22 disposed above the container 11. This is achieved by using a lifting device able to be used as a motor 23 mounted on the support 22 and whose motor shaft bears a pinion 24 gearing with a vertical rack 25 situated on the sleeve 20. Therefore, the well 10 is able to descend to the bottom of the container 11 or, on the other hand, gradually extract it from the container and thus fill the inside of the container with layers of successive objects instead of leaving them collectively sink there in bulk. FIG. 6 shows the well 10 in the lifted state in the support 22.

The falling of objects into the container 11 is slowed down by an outgoing track 26 extending under the blades 13 and having a rounded shape between one upper edge 27 connected to the well 10 and an approximately horizontal lower edge 28 extending past the blades 13 and passing under the counter-wall 14.

The well 10 is fed by a conveyor 29 formed of an ordinary endless belt 30 taut between pulleys, and a slide track 31 and the blades 13 and with which it can form an extension. FIG. 3 shows that the blades 13 and the open face of the well 10, which is orientated towards the conveyor 29, are bent inwards and significantly wider than the endless belt 30 and the slide track 31. This is explained by the fact that the conveyor 29 is mounted on an oscillating support 32 which communicates to it an alternative transverse movement when it is driven by a second motor 33 around a vertical axis 34. The glide track 31 therefore scans the open face of the well 10 and distributes the objects over its entire width. A third motor 35 is able to move the container 11 horizontally by means of a pinion 36 which gears with a rack 37 fixed to this container. In fact, the rack 37 can be fastened to a support 38 in a recess 39 holding the container 11 and sliding along rails 40.

Figure 2:
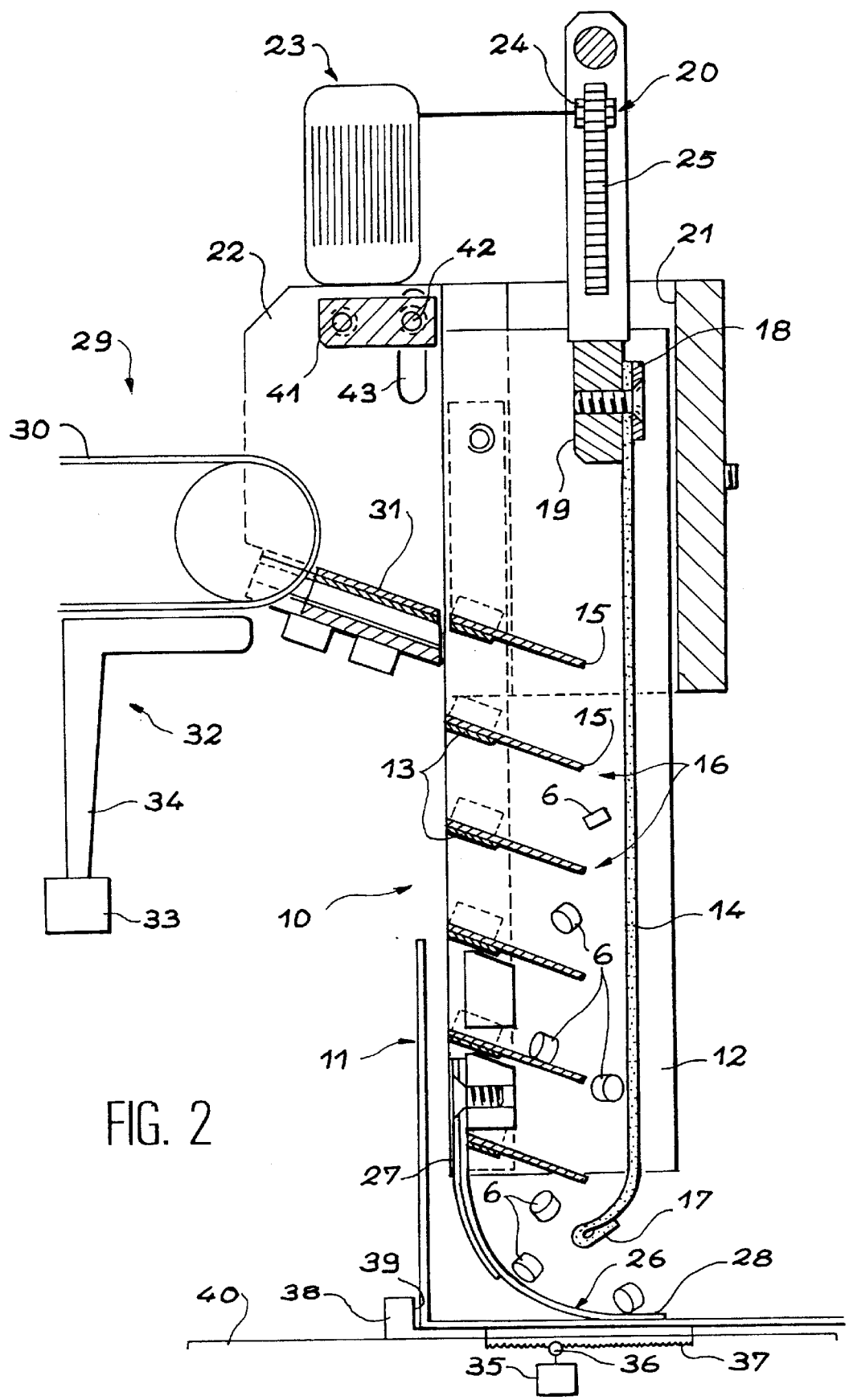

To sum up, the second motor 33 is driven with a continuous uniform oscillating movement which distributes the objects to be carried over the entire width of the well 10, the third motor 35 being driven with a dissymmetrical oscillating movement which moves the container 11 and its support towards the right of FIG. 2 at a relatively slow speed so as to place there a layer of objects, after which the first motor 23 is started for a short while so as to slightly lift up the well 10 and the outgoing track 26 of the layer of the placed objets, and the third motor 35 is started in the opposite direction so as to bring the device into a position where the well 10 extends to the right end of the container 11. The movement towards the right of the container 11 is then resumed so that a continuous layer of objects is placed above the preceding one.

By leaving the glide track 31, the objects then roll onto the blades 13 before leaving them and rebounding onto the counter-wall 14 towards the immediately lower blade 13. The bent inward edge 17 then projects them onto the outgoing track 26 along which their downward movement stops. As the blades 13 and outgoing track 26 are covered with a damping material, such as silicon, the kinetic energy of the objects is mostly absorbed and the fall is slowed down. The continuous feeding and descending of the objects and the dispersion of the latter over the entire width of the well 10 reduce the risk that they strike one another, and the movements procured by the various motors enable them to be carefully placed in the storage container 11.

Figure 3:
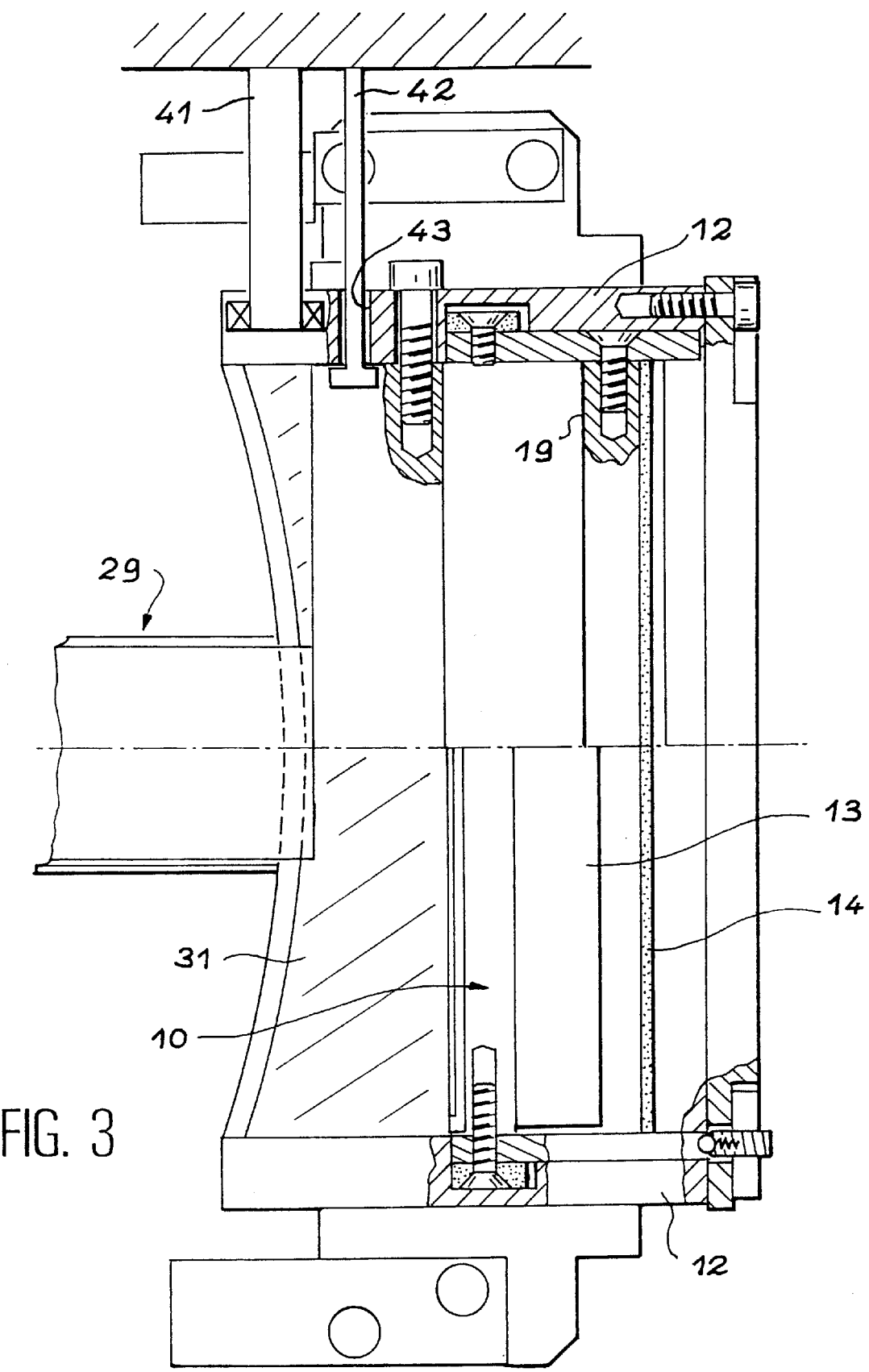
Figure 4:
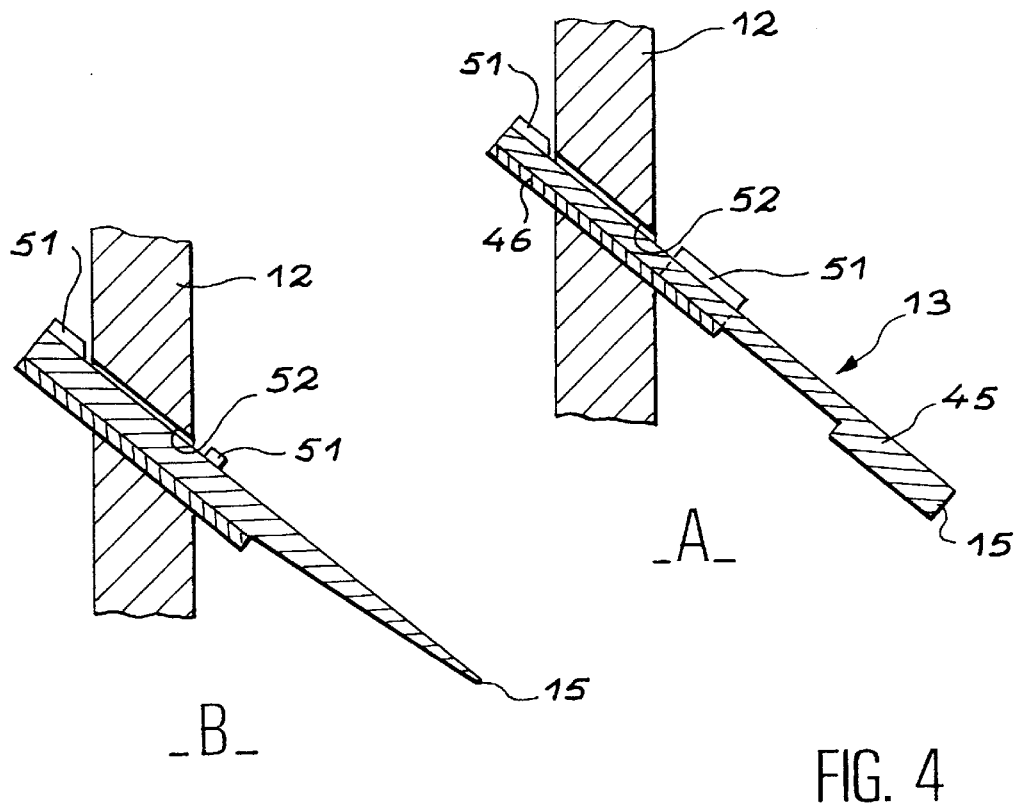
Figure 4:
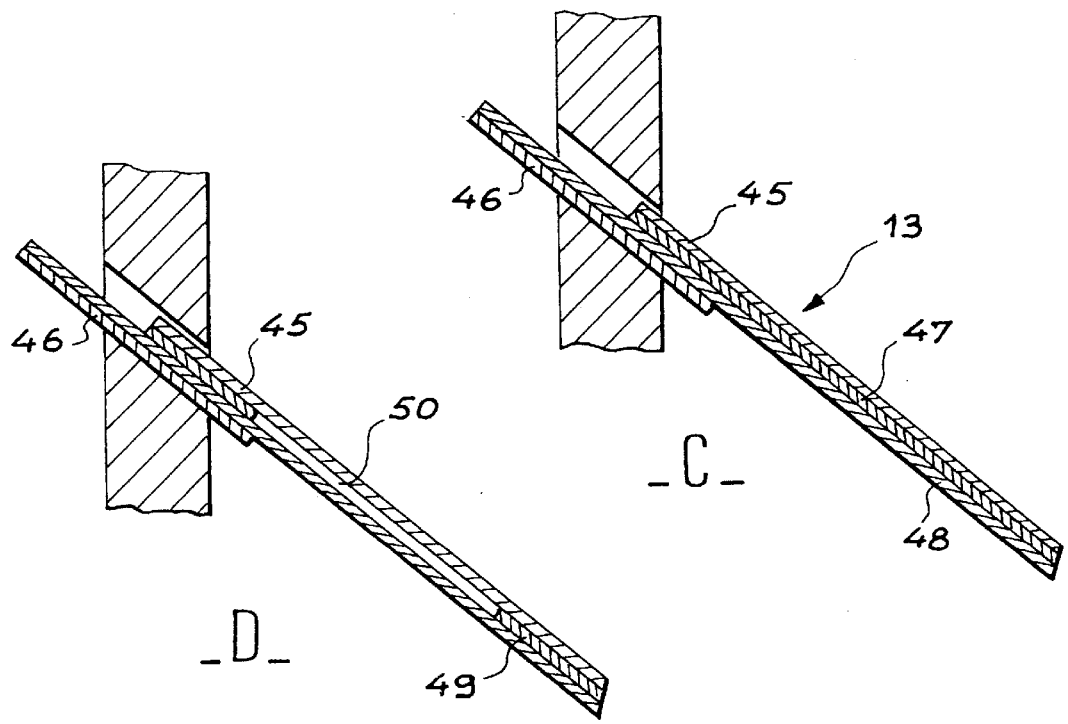

It is preferable that the device is able to adjust the falling characteristics. One idea consists of acting on the inclination of the blades 13. It is possible to mount them on the lateral walls 12 of the well by pivoting supports held by pressure screws at the desired angle. Another solution consists of slanting the entire well 10 by screwing its support 22 onto a fixed frame by means of a transverse axis 41 (FIG. 3) around which the support 22 rotates, this screw passing through an arc of a circle-shaped notch 43 of the support 22.

As regards the mechanical properties of the blades 13, FIGS. 4A to D show several possible embodiments for these: they most frequently consist of at least one upper damping layer 45 and a lower stiffening core 46 which can be rigid or elastic. The damping layer 45 may have a continuous thickness increasing towards the lower edge 15 (A), or on the other hand decreasing (B) continuously or via abrupt thickness variations. Figure C shows the use of two intermediate layers 47 and 48 with different lengths and providing the desired properties of rigidity or elasticity to the entire blade 13. Finally, figure D illustrates the use of a recessed intermediate layer 49, reduced in fact at one rectangular border, and which makes it possible to place a gaseous pocket 50 under the damping layer 45, which is likely to accentuate the latter's flaccidity. The stiffening core 46 may appear in the form of a plate able to move with respect to the rest of the blade 13: it can then be provided with elastic lips 51 which keep the other layers of the blade on it whilst enabling them to slide and move as required by the person making the adjustment.

In the embodiment shown, the blades 13 are housed inside the grooves 52 of the lateral walls 12 of the well 10 and may be retained by the edges of the lips 51 or even by means of screws, by means of gluing, etc.

Figure 5:
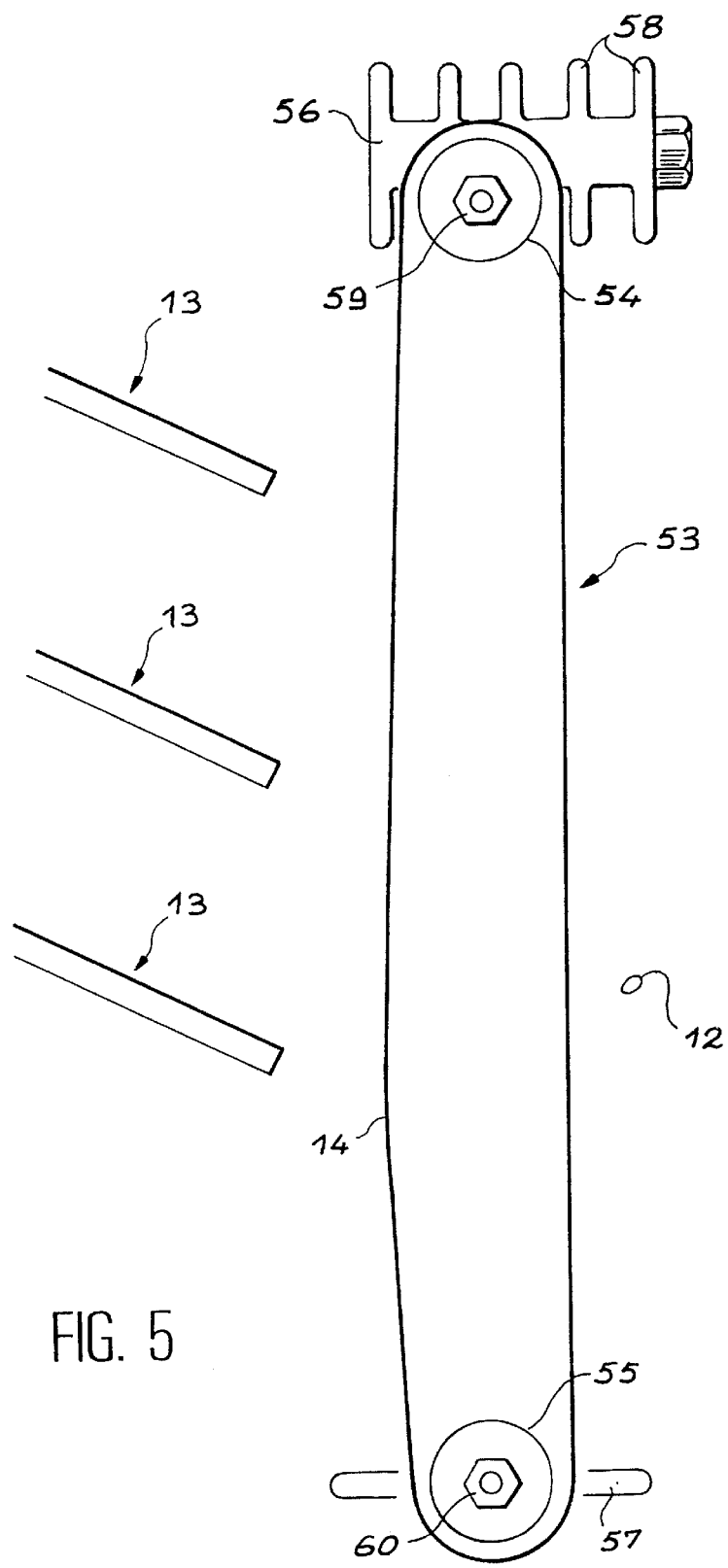
Figure 6:
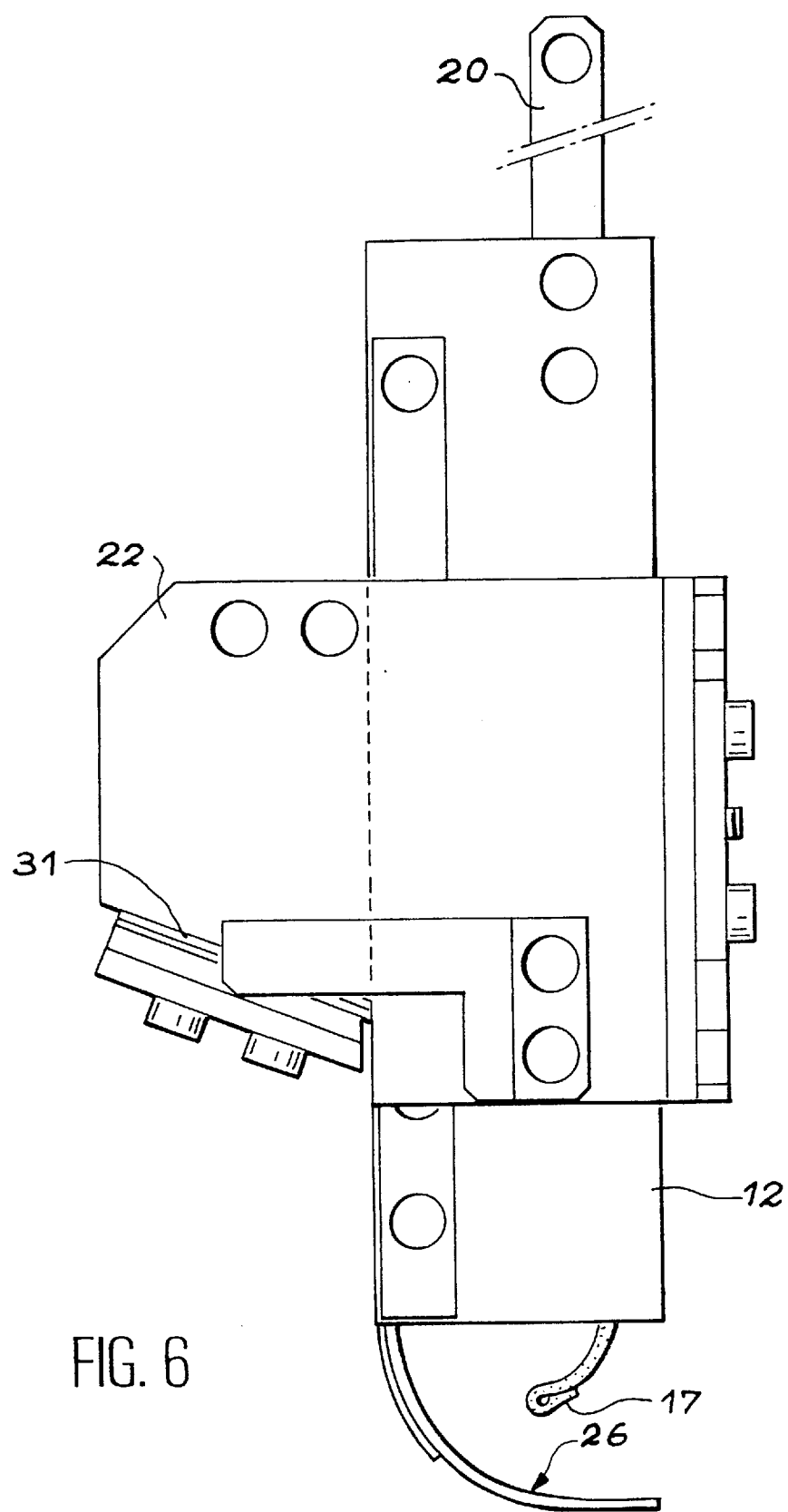

A final adjustment, which may be advantageous, concerns the width of the gaps 16. In certain embodiments, the blades 13 can be temporarily loosened and moved forward or backward in the grooves 52. In the embodiment of FIG. 2, it would be possible to have a shim between the counter-wall 14 and the small bar 19. In the embodiment of FIG. 5 where the counter-wall 14 is constituted by one of the strips of an endless belt 53 taut between two pulleys 54 and 55, the same adjustment can be obtained by moving the pulleys 54 and 55 in respective recessed horizontal slits 56 and 57 in the lateral walls 12 of the well 10. An adjustment of the tension of the belt 53 can be obtained if vertical slits 58 are made to join one of the horizontal slits 56. In this representation, the pulleys 54 and 55 are immobile and tightened by bolts 59 and 60 on the lateral wall 12. In another embodiment where the endless belt 53 were still to be used, it would be possible to move it by means of a motor, one of the pulleys then being driving and immobile and the other able to be moved horizontally and vertically in the slits, such as 56 and 58. It would then be mounted idle on a spindle which would be screwed into these slits.

The objects carried by means of this invention may be agglomerated powder pellets.

What is claimed is:

1. Device for carrying objects and including a well occupied by superimposed blades for slowing down the fall of the objects, wherein the blades are fixed and wherein the well includes an elastic wall situated in front of the lower edges of the blades and at a distance from these edges, and wherein it includes a track situated under the blades and rounded between one approximately vertical upper edge connected to the well and an approximately horizontal lower edge extending under the elastic wall, the blades and the track being covered with a damping material.

2. Carrying device according to claim 1, wherein the well is mounted on a support so as to be able to be slanted.

3. Carrying device according to claim 1 and characterized by a device for adjusting the space of the elastic wall at the blades.

4. Carrying device according to claim 1 and characterized by a device for adjusting the tension of the elastic wall.

5. Carrying device according to claim 1, wherein the blades are composites and including a core formed of at least one rigid or elastic plate under the damping material.

6. Carrying device according to claim 5, wherein the core includes a rigid sliding plate and occupying a variable length under the damping material.

7. Carrying device according to claim 1, wherein the well penetrates into a container for holding the objects and slides vertically inside a support to which it is connected by a lifting device.

8. Carrying device according to claim 7, wherein the support of the well and the track are connected by a device communicating to them a relative alternative and horizontal movement.

9. Carrying device according to claim 7, wherein the well is fed by a conveyor fending in front of the blades and able to move transversally with an alternative movement.

10. Carrying device according to claim 9, wherein the conveyor is placed on a support pivoting around a vertical axis, the well having a concave surface in front of the conveyor.

* * * * *